US006813246B1

United States Patent
Phan et al.

(10) Patent No.: US 6,813,246 B1
(45) Date of Patent: Nov. 2, 2004

(54) ROUTING CALLS WITH OVERFLOWS IN A PRIVATE NETWORK

(75) Inventors: Cao Thanh Phan, Rueil Malmaison (FR); Jacques Litteaut, Marly le Roi (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/362,117

(22) Filed: Jul. 28, 1999

(30) Foreign Application Priority Data

Aug. 6, 1998 (FR) .......................................... 98 10129

(51) Int. Cl.$^7$ ................................................. H04J 3/14
(52) U.S. Cl. .................................. 370/238; 379/114.02
(58) Field of Search ................................ 370/229, 230, 370/234, 235, 238, 238.1, 252, 253, 255, 351, 400, 254, 256, 352; 379/114.01, 114.02, 114.06, 220.01, 221.02, 229, 220

(56) References Cited

U.S. PATENT DOCUMENTS

| | | | |
|---|---|---|---|
| 5,274,643 A | 12/1993 | Fisk | |
| 5,455,855 A | * 10/1995 | Hokari | ....................... 379/229 |
| 6,104,701 A | * 8/2000 | Avargues et al. | ........... 370/238 |
| 6,141,411 A | * 10/2000 | Robinson et al. | ...... 379/221.01 |

FOREIGN PATENT DOCUMENTS

| | | |
|---|---|---|
| DE | 196 14 926 A1 | 10/1997 |
| EP | 0 798 942 A2 | 10/1997 |
| GB | 2 300 089 A | 10/1996 |

OTHER PUBLICATIONS

N. Shaye: "Private Interconnect Networks Overview" GTE Automatic Electric World–Wide Communications Journal, vol. 20, No. 1, 1982, ages 2–12, XP002101198.

Werner, W.: "Wirtschaftlichkeit aks/oberstes Gebot" Telcom Report, vol. 19, No. 4, 1996, pp. 23–25, XP000629281.

Torrieri D.: "Algorithms for Finding an Optical Set of Short Disjoint Paths in a Communication Network" IEEE Transactions on Communications, vol. 40, No. 11, Nov. 1, 1992, pp. 1698–1702, XP000336308.

Chia–Jiu Wang et al.: "The Use of Artificial Neural Networks for Optimal Message Routing" IEEE Network: The Magazine of Computer Communications, vol. 9, No. 2, Mar. 1, 1995, pp. 16–24, XP000493486.

* cited by examiner

*Primary Examiner*—Dang Ton
*Assistant Examiner*—Phuc Tran
(74) *Attorney, Agent, or Firm*—Sughrue Mion, PLLC

(57) ABSTRACT

A method of routing a call in a private network, with overflow (alternate routing) onto another network, calculates various routes for setting up the call, with one or more overflows onto the other network, and chooses a route as a function of the overflow cost and the number of overflows. This minimizes the overflow cost and maximizes the use of private network resources. Taking the number of overflows into account limits the call setup time.

20 Claims, 2 Drawing Sheets

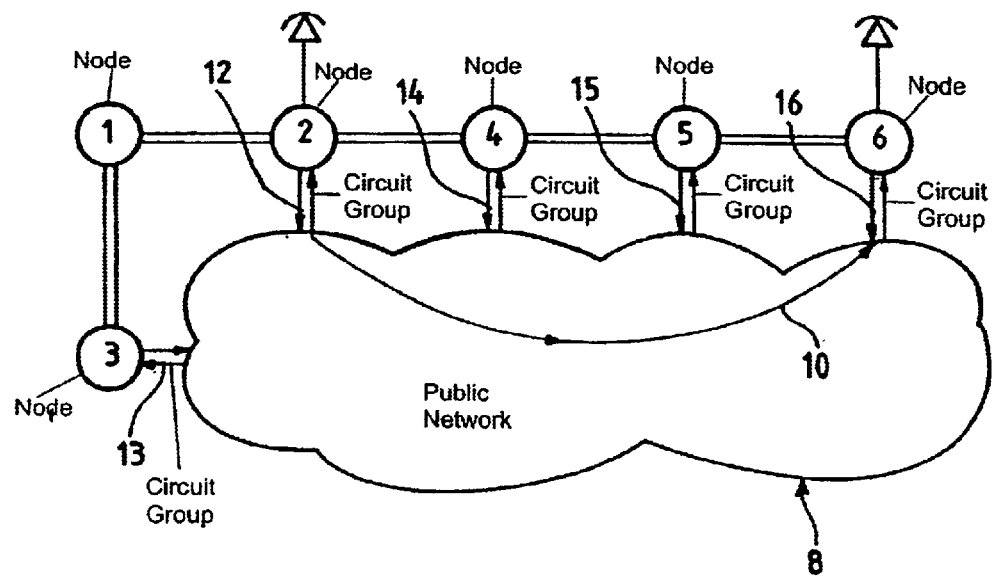
FIG_1 PRIOR ART
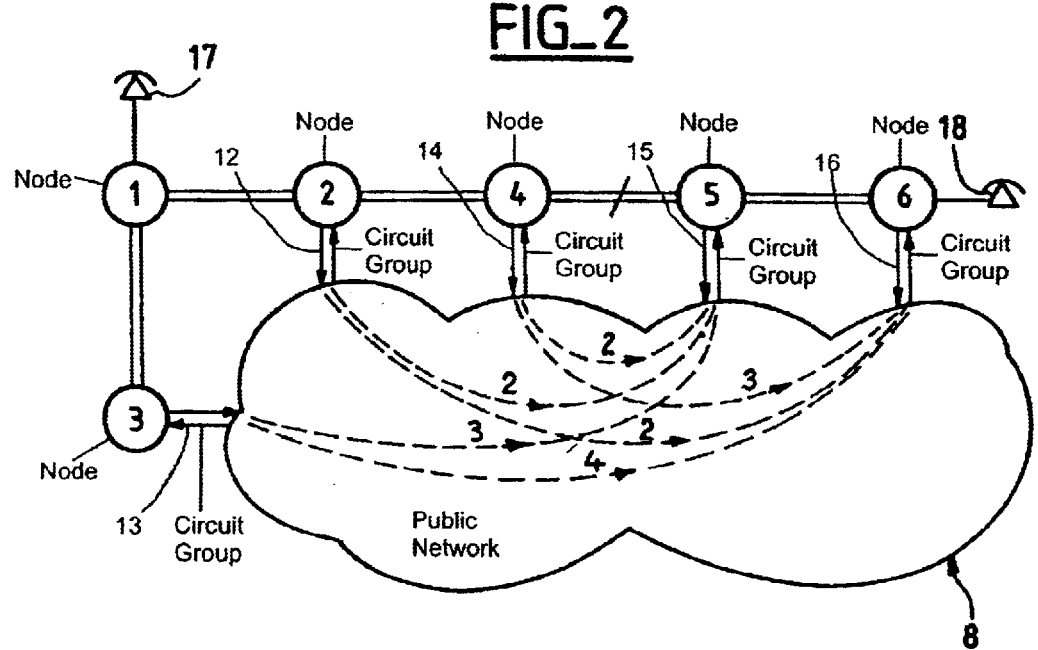
FIG_2

FIG_3
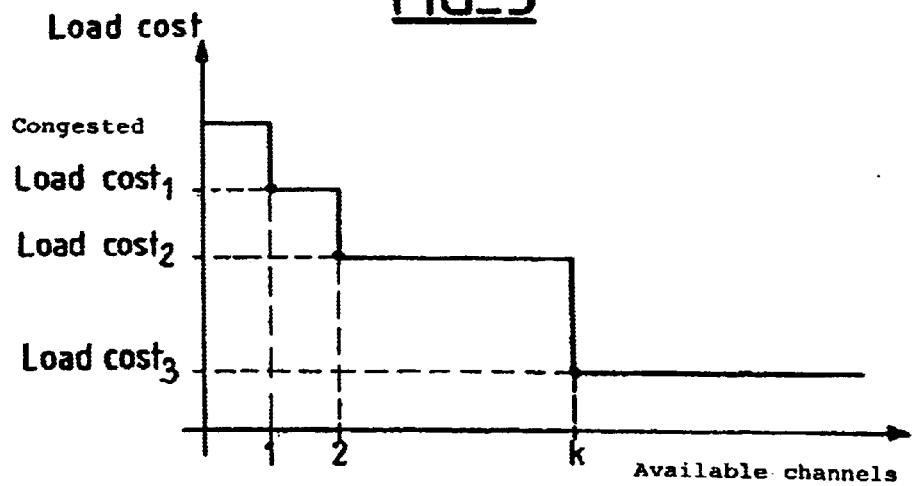
FIG_4
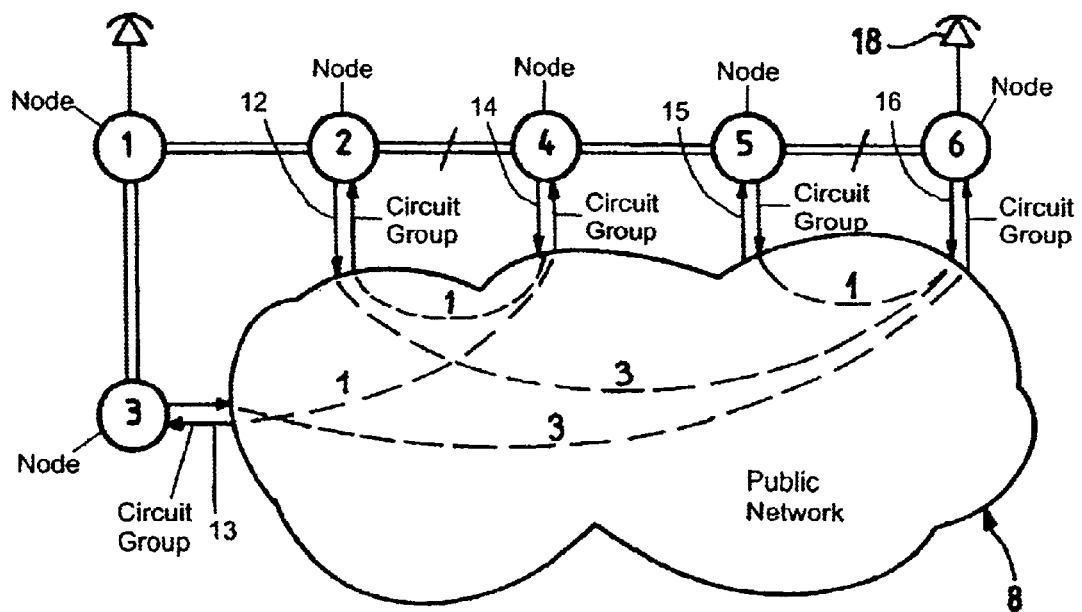

ROUTING CALLS WITH OVERFLOWS IN A PRIVATE NETWORK

BACKGROUND OF THE INVENTION

1. Field of the Invention

The present invention consists in a method of routing a call in a private network with overflow to a public or other network.

The invention concerns private telecommunication networks. Such networks are formed of communication nodes connected by links carrying calls and/or signaling.

2. Description of the Prior Art

The Dijkstra algorithm is described in the literature on algorithms and calculates the shortest path between two nodes in a graph. The algorithm operates as follows: it considers a graph G with N nodes, which is valued, i.e. each existing path of which between two nodes i and j is assigned a value or weight I(i, j). it considers an outgoing node s of the graph G and an incoming node d; it seeks a path minimizing $\pi$ (s, d), the distance from s to d, i.e. the sum of the values of the connections connecting s to d. S is the subgraph of G formed of the nodes x for which the minimum path to s is known, and $\overline{S}$ is its complement. $\Gamma_i$ is the set of nodes adjoining a given node i.

Initially the subgraph S contains only the node s, and $\overline{S}$ contains all the other nodes, assigned the following initial values:

$\pi(s, i) = I(s, i)$ for $i \in \Gamma_s$, the parent node being s;

$\pi(s, d) = \infty$, for the other nodes, which have no parent node.

An iteration of the algorithm is effected in the following manner.

If $\overline{S}$ is empty, or if it contains only nodes i with $\pi(s, i) = \infty$, the algorithm has finished.

Otherwise, the node n of $\overline{S}$ is considered which is nearest the originating node, i.e. the node which minimizes $\pi(s, i)$, $i \in \overline{S}$; this node is taken from $\overline{S}$ and placed in S.

The nodes adjacent this node n are then considered and the algorithm calculates $\pi(s, n) + I(n, j), j \in \Gamma_n$ and $j \in \overline{S}$;

If this quantity is less than $\pi(s, j)$, then $\pi(s, j)$ is updated:

$\pi(s, j) := \pi(s, n) + I(n, j)$ and the parent node of j is also updated, which becomes n.

This operation is carried out for all the nodes of $\Gamma_n$, after which $\overline{S}$ is reordered.

In this way, all the nodes of the graph are progressively added to S, in order of increasing path length. To find a path to a given node d, the algorithm can be interrupted before it finishes, since the destination node a has been added to the subgraph S.

The validity of the algorithm is demonstrated by the following reductio ad absurdum argument. Consider the node n nearest $\overline{S}$ which must be added to S. If there is a nearer path, that path starts from s and arrives at n and has a first node m in $\overline{S}$. Then:

$\pi(s, m) + \pi(m, n) < \pi(s, n)$ and, since $\pi(m, n)$ is positive or zero:

$\pi(s, m) < p(s, n)$ which contradicts the hypothesis. It is also clear that $\pi(s, m)$ has been calculated in a preceding iteration, when adding the parent of m to S.

The document by J. Eldin and K. P. Lathia "Le RNIS appliqué au Centrex et au réseaux privés virtuels" [The ISDN applied to Centrex and to virtual private networks] contains a description of physical private networks and virtual private networks. As explained in the document, in a physical private network the various sites or nodes are connected by dedicated circuits but in a virtual private network each node is connected to the local switch nearest the public network, where appropriate software sets up the connections on demand. There are two variants of the virtual private network: on the one hand, semi-permanent connections can be provided, which are set up without dialing as soon as any of the nodes requires the circuit, and which always connect the same two points. Such may be the case in particular for signaling connections in an application on an integrated services digital network. On the other hand, switched connections can be provided, which can be set up only by dialing.

The remainder of the description considers only physical or virtual private networks formed of nodes connected by links, which can be of any type: dedicated connections, or links using an external network; the latter can be of any type—the public switched network, a public land mobile network, an integrated services digital network, another private network, etc. FIG. 1 shows one example of a private network of this kind. This network includes, for example, nodes 1 to 6; nodes 2 to 6 are connected to the public network 8 by circuit groups 12 to 16. The nodes are interconnected by links formed of private connections, shown in bold in the figure, or, as in the case of the link between nodes 5 and 6, by a link comprising only a signaling connection. For a digital link, each private connection comprises at least one access, formed by a signaling connection and a plurality of B channels. The link between nodes 5 and 6 in FIG. 1 comprises a signaling connection and no B channel; this is typical of a node corresponding to a branch office, for which the volume of traffic is not very high.

The problem of overflow, i.e. the problem of a call request that cannot be satisfied by the network because its resources are congested, arises in private networks. This problem can arise if the private links of the private network have a fixed capacity, rather than a capacity which is allocated dynamically and which is less than the possible maximum volume of traffic. Completing the corresponding call using the public network is known in itself. In other words, if a user at node 2 wants to contact a user at node 6, and if the private network is congested and cannot complete the call, the call is completed via circuit groups 12 and 16 and the public network. This can be the case, for example, if the connection between nodes 2 and 4 is congested. In FIG. 1, reference numeral 10 shows schematically a call of this kind via the public network. Overflow may also be necessary if the link in question has no B channel, as in the case of node 6 in FIG. 1.

This solution gives rise to the following problems. On the one hand, using the public network incurs a cost; on the other hand, it is not certain that there is an access group to the public network for all the nodes; in the FIG. 1 example, node 1 has no group providing access to the public network and as a result a call via the public network could be routed via group 12 of node 2 or group 13 of node 3.

The invention proposes a solution to the above problems; it manages overflows from the private network in a way that minimizes the cost of access to the public network and maximizes the use of resources of the private network. It applies not only to overflows to the public network, but also and more generally to overflows to any type of network external to the private network: switched public network, public land or satellite mobile network, another private network, etc.

SUMMARY OF THE INVENTION

To this end, the invention proposes a method of routing a call in a private network, with overflow to another network, which comprises calculating various routes for setting up said call, with one or more overflows to said other network, and choosing a route as a function of the overflow cost and the number of overflows.

In one embodiment of the invention the choice is made from routes having a number of overflows less than a predetermined threshold value.

This predetermined threshold value is advantageously chosen as a function of the maximum call setup time. In one embodiment of the invention the predetermined value is 3.

The choice is preferably made to minimize a cost vector of routing the call, the cost vector having as one component the charge incurred because of the overflows and as one component the load of the links of the private network.

A first vector can be less than a second vector if the cost component of the first vector is less than the cost component of the second vector and, if the cost components are equal, if the load component of the first vector is less than the load component of the second vector.

The sum vector of first and second vectors is advantageously defined as the vector in which each component is the sum of the corresponding components of the first and second vectors.

In one embodiment of the invention the various routes are calculated using the Dijkstra algorithm, allowing for the number of overflows.

A step of calculating the minimum number of overflows between a node of the private network and the destination node of the call using the Dijkstra algorithm can be provided.

In this case, during an iteration of the Dijkstra algorithm, a node is ignored if the sum of the number of overflows to that node and the minimum number of overflows to the destination node of the call is greater than the predetermined threshold value.

Other features and advantages of the invention will become apparent on reading the following description of embodiments of the invention, which is given by way of example and with reference to the accompanying drawings.

BRIEF DESCRIPTION OF THE DRAWINGS

FIG. 1 is a diagrammatic representation of a prior art private network.

FIG. 2 is a diagrammatic representation of a private network in which the invention is used.

FIG. 3 is a graph of the load component of the cost vector in accordance with the invention.

FIG. 4 is a diagrammatic representation of another private network in which the invention is used.

DETAILED DESCRIPTION OF THE PREFERRED EMBODIMENT

Instead of systematic end to end overflow if a call cannot be completed in a private network, the invention proposes overflow on only certain links, preferably only on links which are effectively congested. Because the connection setup time depends on the number of hops or overflows to the external network, denoted Hop hereinafter; to improve the call setup time the invention also proposes to allow only a limited number of overflows, denoted Hmax hereinafter.

FIG. 2 is another diagrammatic representation of a private network, similar to that from FIG. 1; FIG. 2 also shows connections with overflow in accordance with the invention. The structure of the FIG. 2 network is identical to that of the FIG. 1 network and the same reference numerals are used. Overflows to the public network are considered by way of example in the remainder of the description.

The invention proposes to calculate the various routes for setting up the call and to choose one of these routes depending on the overflow cost (Cost) and the envisaged number of overflow hops. To model the cost of overflows, the invention proposes to use a cost vector (Cost) which has two components, TaxCost and LoadCost:

$$Cost:=(TaxCost; LoadCost)$$

The first component TaxCost is representative of the charge incurred because of the overflows, and is described in more detail hereinafter; the second component LoadCost is a private network connection load component. Thus allowance is made both for the charging for the overflow by the network operator and occupancy of the private network resources. The cost vector for one possible routing of a call is defined by an iterative process which sums the cost vectors defined on each of the links and each of the overflows constituting the envisaged route. Thus only the cost vector between two nodes and the sum function of the two vectors are defined. The latter can simply be the standard sum in the corresponding vector space, i.e. the sum vector has for its components the sums of the respective components of the summed vectors:

$$Cost1+Cost2:=(TaxCost1+TaxCost2; LoadCost1+LoadCost2)$$

FIG. 3 shows one possible form of the second component LoadCost, representative of the load of a link of the private network. By definition this second component is zero in the case of an overflow; it is also possible for the second component to be non-zero to allow for the load of the circuit groups that permit overflow. For a link of the private network it can take the form shown in FIG. 3: the figure shows essentially that the load is a real function of a real variable which is the number of free channels on the link, which is a decreasing value. The function is a step function in the figure, but only values of the functions for integer values of the number of free channels are important for the calculations. For the case of an ISDN, in which the link is formed of a plurality of T0 or T2 accesses, the number of free B channels is plotted on the horizontal axis. By definition, the load has an infinite value—i.e. a value higher than any other—if the link is cut. It has a "congested" value if no channel is available; this "congested" value is chosen to be greater than the sum of all possible costs of routing via B channels. It has a first value LoadCost1 if only one channel is available, a second value LoadCost2 if 2 to k channels are available, where k is an integer, and a value LoadCost3=1 if more than k channels are available, with LoodCost1>LoadCost2. A value of k in the order of 10 is appropriate; choosing a relatively low value of k avoids recalculation of the routes provided that the cost does not vary. Other values are possible, depending in particular on the capacity of a link and the number of channels occupied by a call. The choice of the values LoadCost1 and LoadCost2, like the choice of the load values for which the function changes values, depends on the nature of the network and of the required load distribution.

The first component TaxCost of the cost vector is defined in the following manner; for a link of the network, the component is zero by hypothesis; for an overflow, the component is fixed by the private network administrator, for example in accordance with the charge levied by the operator and the average call duration.

It is also possible to choose a cost vector that allows not only for the link but also, in the case of an overflow, the groups providing access to the external network. In this case, the LoadCost could be the highest value of the group loads used for the overflow, the parameters of the TaxCost component of the cost vector being set as indicated above. This solution takes into account not only the congestion of the connection but also, in the case of an overflow, the congestion of the groups.

To be able to compare the costs of two routes, it is necessary to define a spatial order of the cost vectors. This order can be defined in the following manner, for example:

Cost1<Cost2 if TaxCost1≨TaxCost2 and TaxCost1<TaxCost2 with

Cost1<Cost2 if TaxCost1=TaxCost2 and LoadCost1<LoadCost2

This definition minimizes the cost of overflows and, for equal cost, maximizes the use of the private network. The order can be changed to achieve different objectives.

The above definitions enable the various possible routes to be calculated and compared to choose one of them. The invention further proposes to use the Dijkstra algorithm to determine a route for the call that minimizes the cost vector defined above, allowing for the limitation on the number of overflows. In the application of the above algorithm to the present invention, the nodes of the graph are nodes of the private network. The paths between the nodes are the links of the private network or, in a situation where overflow is possible, overflows via the public network. The distance is the cost vector defined above and the standard relationship of order in the real numbers is replaced in the application of the algorithm by the order relationship also defined above.

The first step is to apply the Dijkstra algorithm to the network, without allowing for the limit on the number of overflows allowed. This produces, for a given combination of calling party and called party, or to be more precise for a given combination of calling node and called node, a shorter route in the sense of the order defined for the cost vectors. If the route obtained meets the maximum number of overflows condition, an optimum route has been determined and can be used.

If the proposed route does not satisfy the number of overflows condition, i.e. if the number of overflows is greater than the maximum number of overflows allowed (Hmax), the following procedure can be used. The first step is to calculate for the nodes of the private network the minimal number Hopr(n, d) of overflows between two nodes. This can be done by applying the Dijkstra algorithm, starting from the destination node and considering the graph formed by the nodes of the private network, with a value of 1 for overflows and a value of 0 for the links of the private network.

The procedure is then as in the Dijkstra algorithm, adapted to take account of the number of overflows and to use the Cost defined above. At initialization, the node s is put in S and all the other nodes are put in $\overline{S}$, with the following values for the i nodes of $\Gamma_s$:

Cost(s, i)=the cost of the link between s and i;

the parent node of i is s;

Hop(s, i):=0, if the link between s and i is part of the private network, or 1 in the case of overflow between s and i, with 1 and for the other nodes j of $\overline{S}$:

Cost(s, j):=∞;

there is no parent node of j;

Hop(s, i):=∞;

An iteration of the algorithm proceeds in the following manner; after taking from $\overline{S}$ the node n nearest the source node, the algorithm verifies if:

Hop(s, n)+HOP$_r$(n, d)≦Hmax

If not, it is known that the route between s and d cannot pass through the node n, and that there is no path between s and d satisfying the limitation on the number of overflows. In contrast, if Hop(s, n)+HOP$_r$(n, d)≦Hmax the node n can be added to S.

This modification of the Dijkstra algorithm is one solution in accordance with the invention to the problem of finding a shorter path in the sense of the cost defined above whilst complying with the limitation on the number of overflows.

Furthermore, the invention proposes to improve further the results of the algorithm in the following manner. On an iteration, the algorithm considers neighbors of the node that has just been added to the subgraph S and verifies whether these nodes can become closer to the node s via the node n, complying with the limitation on the number of overflows. In other words, for any node v of Gn, the algorithm calculates Hop$_n$(s, v)+Hop$_r$(n, d)

where Hop$_n$(s, v) is the number of overflows between s and v passing through n. If this quantity is strictly greater than Hmax, the algorithm does nothing.

In contrast, if

Hop$_n$(s, v)+Hop$_r$(n, d)≦Hmax it verifies if

Cost(s, n)+Cost(n, v)<Cost(s, v)

If so, the node v can become closer via the node n. The algorithm can then update Cost(s, v):=Cost(s, n)+Cost(n, v)

the parent node of v, which becomes n, and

Hop(s, v):=Hop(s, n), if the link between n and v is part of the private network, and Hop(s, n)+1, if the passage from n to v entails an overflow.

This variant of the Dijkstra algorithm can find an optimum route, if there is one, i.e. one which minimizes the cost vector in the sense of the order defined above. It can find a route between s and d if the node d is added to the set S.

This can be shown by considering the algorithm in a given state in which n is the summit of the subgraph. Assume that there is another, shorter path from s to n, via nodes that are not part of S. Let p be the first node of this path which is not part of S. The cost p.Cost from s to n via the node p is written:

p.Cost=Cost(s, p)+Cost(p, n)

By virtue of the definition of n

Cost(s, p) ≧ Cost(s, n)

and because Cost(p, n) ≧ 0, p.Cost ≧ Cost(s, p) ≧ Cost(s, n)

Thus there cannot be a shorter path. If a solution exists, it remains to be proved that it satisfies the constraint on the number of overflows. For any node x in the subgraph S, Hop(s, x)+HOP$_r$(x, d) ≦ Hmax because of the condition that is tested on each iteration. If there is a solution for the destination d, the iterations are continued until d is in the set S, and therefore Hop(s, d)+Hop$_r$(d, d) ≦ Hmax which provides the result, because Hop$_r$(d, d) is zero.

It is nevertheless possible for the maximum number of overflows to be necessarily reached for any route from s to d; this then becomes apparent on the first application of the Dijkstra algorithm to calculate the minimum number of overflows; calculating Hopr(s, d) means that the calculations can be stopped if they cannot possibly provide a path.

The invention therefore makes it possible to find the optimum route in the sense of the order defined above easily and quickly. In the worst case scenario, the Dijkstra algorithm or its variant in accordance with the invention is applied three times. Other algorithms or other methods could also be used. The performance of the algorithm leads to a result in a time O(n2), where n is the number of nodes of the private network. To obtain a result faster, heuristics could be used, like that described by way of example. The heuristic is based on the fact that it is not necessary to carry out a new calculation if there is no modification to the state of a link of the private network. In this case the benefit of the function defined with reference to FIG. 3 having a constant value as soon as the number of free channels exceeds a given value is clear.

However, because the overflows depend on the public network access groups, a calculation can also be carried out for each access to a node that can be reached only by overflows, or for any modification of the public network access groups; this is the case in particular if the cost vector depends on the group level resources, as explained above. In both cases, the invention determines an optimum route quickly.

Thus in a private network with signaling connections, the services of the private network are provided even if the connections are congested (no B channels available). The private signaling protocol can then be used to display the station, the caller Id, paging text, for example.

The FIG. 2 example concerns a calling party 17 at node 1 wishing to call a called party 18 at node 6. If the link between nodes 4 and 5 is congested, as shown in the figure, the invention proposes to consider the various overflow alternatives, with the charges given by way of example:

from node 2 to node 5, charge 2;
from node 2 to node 6, charge 2;
from node 3 to node 5, charge 3;
from node 3 to node 6, charge 4;
from node 4 to node 5, charge 2;
from node 4 to node 6, charge 3;

and to choose the route that minimizes the cost vector, as explained above. In the FIG. 2 example, a choice is made between the overflow between nodes 2 and 5, 2 and 6 or 4 and 5, depending on the load, typically the load of the groups and links used.

FIG. 4 is again a diagrammatic representation of a private network, similar to that from FIG. 2. In the FIG. 4 example, the links between nodes 2 and 4, on the one hand, and between nodes 5 and 6, on the other hand, are congested. In this case, the invention again proposes to consider the various alternative routes, with the following overflows:

from node 2 to node 4, charge 1;
from node 2 to node 6, charge 3;
from node 3 to node 4, charge 1;
from node 4 to node 4, charge 2;
from node 5 to node 6, charge 1.

Again, the routes with a total charge of 2 are considered, overflow from node 3 to node 4 and from node 5 to node 6;
overflow from node 2 to node 4 and from node 5 to node 6;

between which a choice is made according to the load, as explained in connection with the order relationship mentioned above.

Of course, the present invention is not limited to the examples and embodiments described and shown, and is open to many variants that will suggest themselves to the skilled person. It applies to private network types other than those described in the examples.

It is equally clear that the invention is not limited to the embodiment described in which the overflows are to the same public network, usually the public switched network. It also applies when the overflow can be via different public networks, for example the public switched network, at least one public land mobile network, at least one public satellite mobile network, etc. Overflows can then be provided to other networks, in particular by applying the routing algorithm described above. In this case, the expression "public network", used in contrast with "private network", covers all the various networks that can be used to route a call.

The description has covered the limitation on the number of overflows. The routing method of the invention also applies for other types of constraints, for example a limit on the transit time or group delay time of a given call. This is particularly suitable for data networks.

Finally, the description and the claims mention the Dijkstra algorithm. It is to be understood that this expression covers not only the version of the shortest path algorithm proposed by Dijkstra, but also similar versions and in particular the Bellman algorithm or the Floyd algorithm. It should be noted that the Bellman algorithm applies only to graphs with no circuits.

There is claimed:

1. A method of routing a call between terminals of a private network, said private network comprising overflow links to another network, said method comprising:

calculating various routes for setting up said call between said terminals with one or more overflow links to said other network, said route calculation including said overflow links when at least one link in said private network is congested, and choosing a route as a function of an overflow cost and the number of overflow links, wherein said overflow links route the call back into the private network.

2. The method claimed in claim 1, wherein choosing a route comprises making a choice from the calculated routes having a number of overflow links less than a predetermined threshold value.

3. The method claimed in claim 2, wherein said predetermined threshold value is chosen as a function of a maximum call setup time.

4. The method claimed in claim 2, wherein said predetermined threshold value is 3.

5. The method claimed in claim 1, wherein choosing a route comprises making a choice to minimize a cost vector of routing said call, said cost vector having as a first component a charge incurred because of the overflow links and as a second component a load of the links of said private network.

6. The method claimed in claim 5, wherein a first vector is less than a second vector if the first component of said first vector is less than the first cost component of said second vector and, if said first components are equal, if the second component of said first vector is less than the second component of said second vector.

7. The method claimed in claim 5, wherein a sum vector of first and second vectors is defined as a vector in which each component is the sum of corresponding components of said first and second vectors.

8. The method claimed in claim 1, wherein the various routes are calculated using the Dijkstra algorithm, allowing for the numbers of overflow links.

9. The method as claimed in claim 8, wherein the method further comprises calculating a minimum number of overflow links between a node of said private network and a destination node of said call using the Dijkstra algorithm.

10. The method claimed in claim 9, wherein during an iteration of said Dijkstra algorithm a node is ignored if a sum of the number of overflow links to that node and the minimum number of overflow links to the destination node of the call is greater than the predetermined threshold value.

11. A call routing mechanism for routing a call at least in part through a private network and at least in part through another network connected to said private network via overflow links, wherein said call is between terminals of said private network, said call routing mechanism comprising:

a route calculating circuit configured to calculate routes for setting up said call between said terminals, each calculated route using at least one of said overflow links, said route calculation including said overflow links when at least one link in said private network is congested, and a decision circuit configured to choose a calculated routes based on an overflow cost and the number of overflow links in each route, wherein said overflow links route the call back into the private network.

12. The call routing mechanism of claim 11, wherein said decision circuit chooses a route from those calculated routes having a number of overflow links less than a predetermined threshold value.

13. The call routing mechanism of claim 12, wherein said predetermined threshold value is a function of a maximum call setup time.

14. The call routing mechanism of claim 12, wherein said predetermined threshold value is 3.

15. The call routing mechanism of claim 11, wherein the decision circuit chooses said one calculated call route so as to minimize a cost vector of routing said call, said cost vector having as a first component a charge incurred because of the overflow links and as a second component a load of the links of said private network.

16. The call routing mechanism of claim 15, wherein a first vector is less than a second vector if the first component of said first vector is less than the first component of said second vector and, if said first components are equal, if a second component of said first vector is less than the second component of said second vector.

17. The call routing mechanism of claim 15, wherein a sum vector of first and second vectors is defined as a vector wherein each component is the sum of corresponding components of said first and second vector.

18. The call routing mechanism of claim 11, wherein the various routes are calculated using the Dijkstra algorithm, allowing for the numbers of overflow links.

19. The call routing mechanism of claim 18, further comprising an overflow calculation circuit configured to calculate a minimum number of overflow links between a node of said private network and a destination node of said call using the Dijkstra algorithm.

20. The call routing mechanism of claim 18, wherein during an iteration of said Dijkstra algorithm a node is ignored if a sum of the number of overflow links to that node and the minimum number of overflow links to the destination node of the call is greater than the predetermined threshold value.

* * * * *